US008977528B2

(12) United States Patent
Greenberg et al.

(10) Patent No.: US 8,977,528 B2
(45) Date of Patent: Mar. 10, 2015

(54) BONDED REWORK SIMULATION TOOL

(75) Inventors: Craig Greenberg, Kirkland, WA (US); Steven Donald Blanchard, Issaquah, WA (US); Joseph Frank Floyd, University Place, WA (US); Brent Louis Hadley, Kent, WA (US); Lawrence S. Lindgren, Redmond, WA (US)

(73) Assignee: The Boeing Company, Chicago, IL (US)

( * ) Notice: Subject to any disclaimer, the term of this patent is extended or adjusted under 35 U.S.C. 154(b) by 1242 days.

(21) Appl. No.: 12/430,541

(22) Filed: Apr. 27, 2009

(65) Prior Publication Data
US 2010/0274545 A1 Oct. 28, 2010

(51) Int. Cl.
G06G 7/48 (2006.01)
G06F 17/50 (2006.01)

(52) U.S. Cl.
CPC ........ G06F 17/5009 (2013.01); G06F 17/5095 (2013.01); G06F 2217/46 (2013.01)
USPC .......................................................... 703/8

(58) Field of Classification Search
USPC ............................ 219/510; 703/8; 156/60, 94
See application file for complete search history.

(56) References Cited

U.S. PATENT DOCUMENTS

| | | | |
|---|---|---|---|
| 2,771,090 A | 11/1956 | MacGregor et al. | |
| 3,724,808 A | 4/1973 | Sugden, Jr. | |
| 3,792,713 A | 2/1974 | Zadoo | |
| 3,963,044 A | 6/1976 | Brown | |
| 4,089,493 A | 5/1978 | Paulson | |
| 4,588,626 A | 5/1986 | Cologna et al. | |
| 4,820,564 A | 4/1989 | Cologna | |
| 4,961,799 A | 10/1990 | Cologna et al. | |
| 5,023,987 A | 6/1991 | Wuepper et al. | |
| 5,034,254 A | 7/1991 | Cologna et al. | |

(Continued)

FOREIGN PATENT DOCUMENTS

DE 102005025470 A1 12/2006
EP 0359660 A1 3/1990

(Continued)

OTHER PUBLICATIONS

Won-Shik Chu and Sung-Hoon Ahn, "Internet-based Composite Repair", May 2005, Journal of Composite Materials, vol. 39 No. 9, pp. 827-845.*

(Continued)

Primary Examiner — Kamini S Shah
Assistant Examiner — Juan Ochoa
(74) Attorney, Agent, or Firm — Yee & Associates, P.C.

(57) ABSTRACT

A method and apparatus may be present for managing rework. A section in a platform having a number of composite materials needing a rework may be identified to form an identified section. A selected rework process to perform the rework of the identified section may be identified. The selected rework process may comprise a process to bond a patch to the identified section. A computer system may perform a simulation of the selected rework process to determine whether the selected rework process provides the rework for the identified section. The simulation may include a thermal analysis. The thermal analysis may take into account a number of structures associated with the identified section. The number of structures associated with the identified section may be located within a distance of the identified section such that the number of structures affect or are affected by bonding of the patch to the identified section.

24 Claims, 8 Drawing Sheets

(56) References Cited

U.S. PATENT DOCUMENTS

| | | |
|---|---|---|
| 5,207,541 A | 5/1993 | Westerman et al. |
| 5,337,149 A | 8/1994 | Kozah et al. |
| 5,477,459 A | 12/1995 | Clegg et al. |
| 5,532,933 A | 7/1996 | Nakata |
| 5,590,268 A | 12/1996 | Doi et al. |
| 5,590,900 A | 1/1997 | Duran et al. |
| 5,827,598 A | 10/1998 | Larsen et al. |
| 5,882,756 A | 3/1999 | Alston et al. |
| 6,084,206 A | 7/2000 | Williamson et al. |
| 6,174,392 B1 | 1/2001 | Reis |
| 6,182,688 B1 | 2/2001 | Fabre |
| 6,373,028 B2 | 4/2002 | Williamson et al. |
| 6,579,481 B2 | 6/2003 | Auman |
| 6,618,133 B2 | 9/2003 | Hedges et al. |
| 6,630,993 B1 | 10/2003 | Hedges et al. |
| 6,697,067 B1 | 2/2004 | Callahan et al. |
| 6,736,354 B2 | 5/2004 | Goto et al. |
| 6,761,783 B2 | 7/2004 | Keller et al. |
| 6,997,415 B2 | 2/2006 | Wozniak et al. |
| 7,194,326 B2 | 3/2007 | Cobb et al. |
| 7,305,277 B2 | 12/2007 | Freeman et al. |
| 7,361,412 B2 * | 4/2008 | Wang et al. ............... 428/686 |
| 7,368,073 B2 | 5/2008 | Krogager et al. |
| 7,398,698 B2 | 7/2008 | Griess et al. |
| 7,447,598 B2 | 11/2008 | Malkin et al. |
| 7,448,270 B2 | 11/2008 | Kollgaard |
| 7,458,543 B2 | 12/2008 | Cutler et al. |
| 7,467,052 B2 | 12/2008 | Vaccaro |
| 7,617,730 B2 | 11/2009 | Georgeson |
| 7,627,447 B2 | 12/2009 | Marsh et al. |
| 7,657,117 B2 | 2/2010 | Saund et al. |
| 7,703,327 B2 | 4/2010 | Georgeson et al. |
| 7,849,729 B2 | 12/2010 | Miller et al. |
| 7,857,925 B2 | 12/2010 | Keller et al. |
| 7,859,655 B2 | 12/2010 | Troy et al. |
| 7,873,494 B2 | 1/2011 | Hadley et al. |
| 7,886,642 B2 | 2/2011 | Barker |
| 8,044,991 B2 | 10/2011 | Lea et al. |
| 8,197,623 B1 | 6/2012 | Westerman |
| 8,218,852 B2 | 7/2012 | Cork et al. |
| 8,290,753 B2 * | 10/2012 | Tryon et al. .................... 703/2 |
| 8,747,592 B2 * | 6/2014 | Stenbaek et al. ............... 156/94 |
| 2002/0060018 A1 | 5/2002 | Lindsay et al. |
| 2006/0053891 A1 | 3/2006 | Georgeson et al. |
| 2006/0132467 A1 | 6/2006 | Saund et al. |
| 2006/0278761 A1 | 12/2006 | Cutler et al. |
| 2007/0095140 A1 | 5/2007 | Kollgaard |
| 2007/0100582 A1 | 5/2007 | Griess et al. |
| 2007/0118313 A1 | 5/2007 | Vaccaro |
| 2008/0000299 A1 | 1/2008 | Georgeson |
| 2008/0021882 A1 | 1/2008 | Pu et al. |
| 2008/0148817 A1 | 6/2008 | Miller et al. |
| 2008/0173762 A1 | 7/2008 | Crowley |
| 2008/0177411 A1 | 7/2008 | Marsh et al. |
| 2008/0183402 A1 | 7/2008 | Malkin et al. |
| 2008/0281554 A1 | 11/2008 | Cork et al. |
| 2008/0308210 A1 | 12/2008 | Keller et al. |
| 2009/0000382 A1 | 1/2009 | Sathish et al. |
| 2009/0086014 A1 | 4/2009 | Lea et al. |
| 2009/0086199 A1 | 4/2009 | Troy et al. |
| 2009/0095378 A1 | 4/2009 | Barker |
| 2010/0042361 A1 | 2/2010 | Hadley et al. |
| 2010/0111501 A1 | 5/2010 | Kashima |
| 2010/0229966 A1 | 9/2010 | Elwart et al. |
| 2010/0250148 A1 | 9/2010 | Meredith et al. |
| 2010/0314029 A1 | 12/2010 | Lindgren et al. |
| 2010/0316458 A1 | 12/2010 | Lindgren et al. |
| 2011/0096149 A1 | 4/2011 | Au et al. |

FOREIGN PATENT DOCUMENTS

| | | |
|---|---|---|
| EP | 1102211 A2 | 5/2001 |
| EP | 1400310 A1 | 3/2004 |
| EP | 1965170 A1 | 9/2008 |
| JP | 11207991 A | 8/1999 |
| WO | 0227259 A2 | 4/2002 |
| WO | 2004106847 A1 | 12/2004 |
| WO | 2006060746 A2 | 6/2006 |
| WO | 2009045770 A2 | 4/2009 |
| WO | 2010034014 A2 | 3/2010 |
| WO | 2010147733 A1 | 12/2010 |

OTHER PUBLICATIONS

Cheng Qi-You; Tong Xiao-Yan; Yao Lei-Jiang; Lu Sheng-Li, Parameter Optimization for Bonding Repair of Composite Laminates Based on Neural Network, Dec. 2008, Computer Simulation Year 2008, Issue 12, p. 205-207, 242 (chinese).*

Cheng Qi-You; Tong Xiao-Yan; Yao Lei-Jiang; Lu Sheng-Li, Parameter Optimization for Bonding Repair of Composite Laminates Based on Neural Network, Dec. 2008, Computer Simulation Year 2008, Issue 12, p. 1-17 (english translation).*

Vlot et al., Bonded Aircraft Repairs Under Variable Amplitude Fatigue Loading and at Low Temperatures, Jan. 2000, Fatigue & Fracture of Engineering Materials & Structures, vol. 23, Issue 1, pp. 9-18.*

Alaimo et al., Global/Local FEM-BEM Stress Analysis of Damaged Aircraft Structures, 2008, CMES, vol. 36, No. 1, pp. 23-41.*

Armentani and Citarella, DBEM and FEM Analysis on Non-Linear Multiple Crack Propagation in an Aeronautic Doubler-Skin Assembly, 2006, International Journal of Fatigue, 28, pp. 598-608.*

Vlot et al., Bonded Repairs for Aircraft Fuselages, 1998, Delft University Press, Series 07: Aerospace Materials 11, pp. V-VII, 23-36.*

Repair of Composite Laminates, Dec. 2000, pp. 1-85.*

Chou Shih-Pin, Finite Element Application for Strength Analysis of Scarf-Patch-Repaired Composite Laminates, Dec. 2006, Thesis M.S., Wichita State University, College of Engineering, Dept. of Aerospace Engineering, pp. 1-217.*

Office action dated Aug. 30, 2013 regarding U.S. Appl. No. 12/468,128, 29 pages.

Notice of allowance dated Jun. 21, 2013 regarding U.S. Appl. No. 12/485,832, 25 pages.

Abdul-Aziz et al., "A CAD Approach to Integrating NDE with Finite Element," National Aeronautics and Space Administration, NASA TM-2004-212904, Apr. 2004, 30 pages.

Abdul-Aziz et al., "Nondestructive Evaluation Correlated with Finite Element Analysis," http://www.grc.nasa.gov/WWW/RT/RT1998/5000/5920aziz.html, Jun. 16, 1999, 5 pages.

Frankle, "Application of NDE Data to Finite Element Analysis of Parts Containing Defects," In: Damage Detection in Composite Materials, Masters (Ed.), American Society for Testing and Materials, Philadelphia, PA, 1992, pp. 85-100.

International Search Report, dated Feb. 8, 2010, regarding Application No. PCT/US2008/077178 (WO2009045770), 5 pages.

International Search Report, dated Apr. 6, 2010, regarding Application No. PCT/US2009/057911 (WO2010034014), 5 pages.

International Search Report, dated Aug. 4, 2010, regarding Application No. PCT/US2010/035908 (WO2010147733), 11 pages.

Manolakis, "Efficient Solution and Performance Analysis of 3-D Position Estimation by Trilateration," IEEE Transactions on Aerospace and Electronic Systems, vol. 32, No. 4, Oct. 1996, pp. 1239-1248.

Rice et al., "Evaluating Lateration-Based Position Algorithms for Fine-Grained Tracking," DIALM-POMC '05 Proceedings of the 2005 Joint Workshop on Foundations of Mobile Computing, 2005, pp. 54-61.

Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.

Tweet et al., "Method and Apparatus for Refueling Aircraft," U.S. Appl. No. 12/468,128, filed May 19, 2009, 57 pages.

USPTO Notice of Allowance, dated Aug. 23, 2011, regarding U.S. Appl. No. 11/863,755, 10 pages.

USPTO Notice of Allowance, dated Oct. 6, 2010, regarding U.S. Appl. No. 12/235,161, 9 pages.

(56) References Cited

OTHER PUBLICATIONS

USPTO Office Action, dated Jul. 20, 2010, regarding U.S. Appl. No. 12/038,352, 14 pages.
USPTO Notice of Allowance, dated Sep. 22, 2010, regarding U.S. Appl. No. 12/038,352, 6 pages.
USPTO Office Action, dated Sep. 22, 2011, regarding U.S. Appl. No. 12/690,389, 9 pages.
USPTO Notice of Allowance, dated Feb. 16, 2012, regarding U.S. Appl. No. 12/690,389, 7 pages.
USPTO Office Action, dated Jul. 12, 2011, regarding U.S. Appl. No. 12/410,838, 10 pages.
USPTO Final Office Action, dated Dec. 12, 2011, regarding U.S. Appl. No. 12/410,838, 8 pages.
USPTO Office Action, dated Mar. 19, 2012, regarding U.S. Appl. No. 12/410,838, 7 pages.
USPTO Office Action, dated Nov. 9, 2011, regarding U.S. Appl. No. 12/468,128, 13 pages.
USPTO Final Office Action, dated May 9, 2010, regarding U.S. Appl. No. 12/468,128, 12 pages.
USPTO Office Action, dated Mar. 9, 2011, regarding U.S. Appl. No. 12/485,832, 18 pages.
USPTO Final Office Action, dated Aug. 24, 2011, regarding U.S. Appl. No. 12/485,832, 22 pages.
USPTO Office Action, dated Mar. 29, 2012, regarding U.S. Appl. No. 12/485,832, 22 pages.
Final Office Action dated Apr. 10, 2014 regarding U.S. Appl. No. 12/468,128, 12 pages.

* cited by examiner ized section. The number of structures associated with the identified section may be located within a distance of the identified section such that the number of structures affect or are affected by bonding of the patch to the identified section.

BONDED REWORK SIMULATION TOOL

BACKGROUND INFORMATION

1. Field

The present disclosure relates generally to aircraft and, in particular, to a method and apparatus for performing rework on an aircraft. Still more particularly, the present disclosure relates to a method and apparatus for simulating bonded rework to an aircraft.

2. Background

Aircraft are being designed and manufactured with greater and greater percentages of composite materials. Some aircraft may have more than fifty percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials, created by combining two or more dissimilar components. For example, a composite may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

During manufacturing and/or use, inconsistencies may occur in various structures of the aircraft. These inconsistencies may result in less than desired performance of the aircraft and/or may be undesirable. When an inconsistency is identified on a composite structure in an aircraft, the structure may be reworked to remove the inconsistency. A rework may involve removing a portion of the composite materials in a section of the composite structure and placing new composite materials into that section. For example, a number of layers of composite material corresponding to the layers of composite material removed in the section may be used as a patch. This patch may be bonded to the section to perform the rework.

These types of rework may be very complex. The rework also may require several days to perform and may require a high level of technical training and experience. In some cases, if a rework is not within tolerances, the patch may be removed and a new patch may be installed. This type of rework may be time consuming and/or expensive.

Therefore, it would be advantageous to have a method and apparatus that takes into account one or more of the issues discussed above, as well as possibly other issues.

SUMMARY

In one advantageous embodiment, a method may be present for managing rework. A section in a platform having a number of composite materials needing a rework may be identified to form an identified section. A selected rework process to perform the rework of the identified section may be identified. The selected rework process may comprise a process to bond a patch to the identified section. A computer system may perform a simulation of the selected rework process to determine whether the selected rework process provides the rework for the identified section. The simulation may include a thermal analysis. The thermal analysis may take into account a number of structures associated with the identified section. The number of structures associated with the identified section may be located within a distance of the identified section such that the number of structures affect or are affected by bonding of the patch to the identified section.

In another illustrative embodiment, a method may be present for simulating a rework process for an aircraft. A location on the aircraft having an inconsistency may be identified. A section of the aircraft having a number of composite materials needing a rework that includes the inconsistency may be identified to form an identified section. A layup for the number of composite materials in the identified section of the aircraft may be determined. Information about a number of structures associated with the identified section may be obtained from an aircraft database. A patch for the identified section may be generated using a computer system and the layup for the number of composite materials. The patch may comprise a plurality of layers of the number of composite materials. The computer system may identify a selected rework process to perform the rework of the identified section. The rework process may comprise a process to bond the patch to the identified section. A simulation of the selected rework process may be performed using the computer system, the patch in the identified section, and the number of structures. The simulation may include a thermal analysis for the patch in the identified section taking into account the number of structures associated with the identified section. The number of structures associated with the identified section may be located within a distance of the identified section such that the number of structures affect or are affected by bonding of the patch to the identified section. Whether the selected rework process provides the rework for the identified section may be determined. Determining whether the selected rework process provides the rework for the identified section may comprise determining whether the selected rework process will cause inconsistencies. In response to a determination that the selected rework process provides the rework, a rework plan may be output for the selected rework process at an output device, and the rework may be performed on the identified section using the rework plan and the patch. In response to an absence of a determination that the selected rework process provides the rework, at least one of the selected rework process and the patch may be modified. Another simulation of the selected rework process may be performed after modifying at least one of the selected rework process and the patch. The steps of modifying at least one of the selected rework process and the patch in response to the absence of the determination that the selected rework process may provide the rework and of performing another simulation of the selected rework process after modifying at least one of the selected rework process and the patch may be repeated until the selected rework process provides the rework.

In yet another advantageous embodiment, an apparatus may comprise a computer system having a number of processor units, a number of storage devices, and a rework tool stored in the number of storage devices in the computer system. The rework tool may be executed by the computer system to identify a section of a platform having a number of composite materials needing a rework to form an identified section; identify a selected rework process to perform the rework of the identified section, the selected rework process comprising a process to bond a patch to the identified section; and perform a simulation of the selected rework process to determine whether the selected rework process provides the rework for the identified section, the simulation including a thermal analysis, the thermal analysis taking into account a number of structures associated with the identified section wherein the number of structures associated with the identified section are located within a distance of the identified section such that the number of structures affect or are affected by bonding of the patch to the identified section.

In still yet another advantageous embodiment, an aircraft rework system may comprise a computer system having a number of processor units, a number of storage devices, and a rework tool stored in the number of storage devices in the computer system. The rework tool may be executed by the computer system to identify a location on the aircraft having an inconsistency; identify a section of the aircraft having a number of composite materials needing a rework that includes the inconsistency to form an identified section; determine a layup for the number of composite materials in the identified section, wherein the identified section is a location for a patch; generate the patch for the identified section using the layup for the number of composite materials; identify a selected rework process to perform the rework of the identified section, the selected rework process comprising a process to bond a patch to the identified section; perform a simulation of the selected rework process using the patch in the identified section, wherein the simulation includes a thermal analysis for the patch in the identified section taking into account a number of structures associated with the identified section, the simulation including a thermal analysis, the thermal analysis taking into account a number of structures associated with the identified section wherein the number of structures associated with the identified section are located within a distance of the identified section such that the number of structures affect or are affected by bonding of the patch to the identified section; determine whether the selected rework process provides the rework for the identified section; output a rework plan for the selected rework process in response to a determination that the selected rework process provides the rework; modify at least one of the selected rework process and the patch in response to an absence of the determination that the selected rework process provides the rework; and perform another simulation of the selected rework process after modifying at least one of the selected rework process and the patch.

In yet another advantageous embodiment, a computer program product may comprise a non-transitory computer recordable storage media and program code stored on the non-transitory computer recordable storage media. Program code may be present for identifying a section of a platform having a number of composite materials needing rework to form an identified section. Program code may be present for identifying a selected rework process to perform the rework of the identified section, the selected rework process comprising a process to bond a patch to the identified section. Program code may be present for performing a simulation of a selected rework process to determine whether the selected rework process provides the rework for the identified section. The simulation may include a thermal analysis. The thermal analysis may take into account a number of structures associated with the identified section wherein the number of structures associated with the identified section are located within a distance of the identified section such that the number of structures affect or are affected by bonding of the patch to the identified section.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
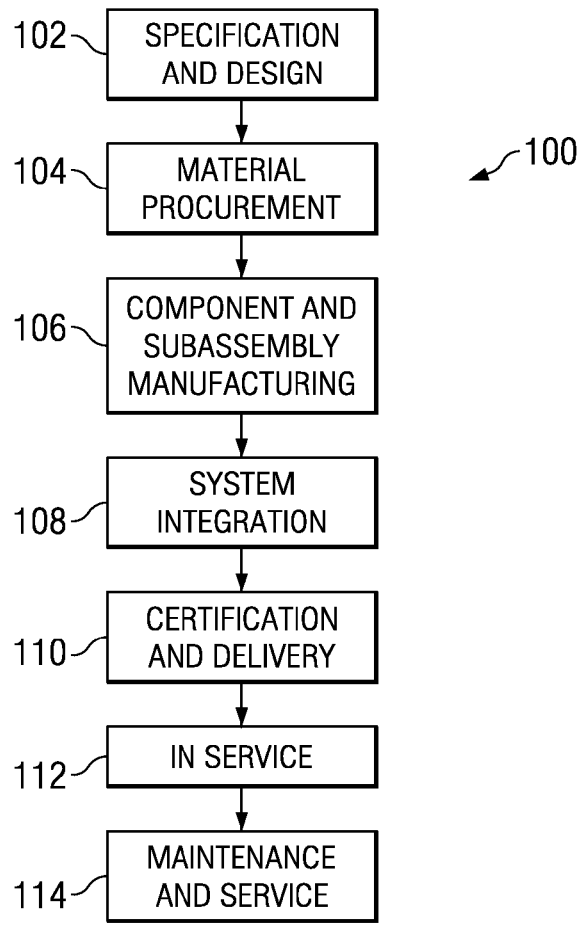
FIG. 1 is an illustration of an aircraft manufacturing and service method in accordance with an advantageous embodiment.
Figure 2:
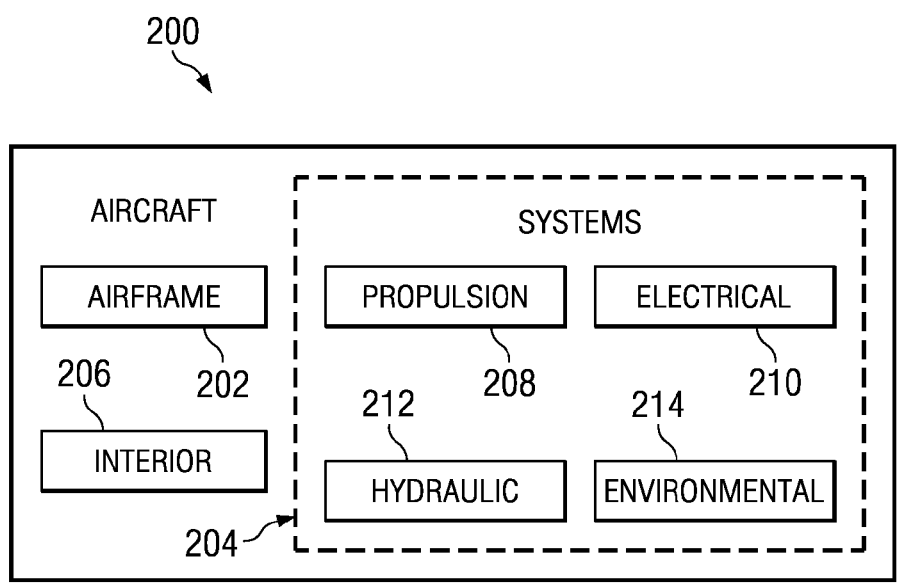
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, one or more of the advantageous embodiments may be applied during component and subassembly manufacturing 106 to rework insistencies that may be found in composite structures. As yet another example, one or more advantageous embodiments may be implemented during maintenance and service 114 to remove inconsistencies that may be identified.

The different advantageous embodiments recognize and take into account a number of different considerations. For example, without limitation, the different advantageous embodiments recognize that in performing rework on composite structures, a maintenance person may need to identify an appropriate patch for the section. In identifying an appropriate patch, the maintenance person may be required to access ply layup data for that location in the aircraft.

This type of access may currently be obtained through the use of a computer-aided design application and a model of the aircraft. This type of access may require the maintenance person to have knowledge of computer-aided design applications to be able to identify the ply layup data for a patch.

Further, the different advantageous embodiments recognize and take into account that rework may sometimes be redone or require a rework of an adjacent structure. The rework process may generate inconsistencies in other structures adjacent to or approximate to the location in which the rework has been performed.

Further, the different advantageous embodiments recognize and take into account that structures associated with the section in which a patch is to be placed may affect the bonding process that occurs to bond the patch to the section. For example, without limitation, the different advantageous embodiments recognize and take into account that when heating is used to bond a patch to a composite structure, adjacent structures may affect the manner in which the heating may occur.

These structures may act as a heat sink and may draw heat away from the patch and/or section in which the bonding is occurring. As a result, the temperature through the patch in the section may not be consistent and may not reach the desired temperatures in all areas of the patch needed to bond the patch to the section. The different advantageous embodiments recognize and take into account that currently, maintenance persons may not be able to take these factors into account. As a result, a rework of a patch with different heating conditions may be required to provide the appropriate bonding and/or to avoid generating inconsistencies in adjacent structures. In some cases, the patch may need to be redesigned and/or reconfigured as part of the rework.

The different advantageous embodiments recognize and take into account that having to redesign and/or reconfigure the rework may increase the amount of time in which an aircraft is unavailable. Further, redesigning and/or reconfiguring the rework also may increase the expense for maintaining an aircraft. This redesign and/or reconfiguring may include, for example, without limitation, redesigning the patch and/or changing the process to bond the patch to the structure. In these illustrative examples, the designing of the rework may include, for example, without limitation, designing the way and extent of the trimming of the rework area. The designing also may include, for example, without limitation, scarfing and step lapping the rework area. Further, the designing may include, for example, without limitation, shaping the trim out area to optimize the rework.

Thus, the different advantageous embodiments provide a method and apparatus for managing rework. In one advantageous embodiment, a section of a platform having a number of composite materials needing rework is identified to form an identified section. Information may be obtained about a number of structures in the identified section of the platform. A layup for the number of composite materials in the identified section of the platform may be determined using the information. A patch may be generated for the identified section of the platform using the layup for the number of composite materials. A simulation of a selected rework process using the patch and the information about the number of structures in the identified section may be performed.

In the different advantageous embodiments, the process also may determine whether the selected rework process is capable of providing the rework for the identified section of the platform. If the selected rework process can provide the rework, the rework may then be performed on the identified section using the selected rework process and the patch.

If the selected rework process does not provide the rework, at least one of the selected rework process and the patch may be modified. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Another simulation of the selected rework process after modifying at least one of the selected rework process and the patch may be performed using the patch and the information about the number of structures in the identified section. These steps may be repeated until the selected rework process is capable of performing the rework. In other words, the steps may be repeated until the selected repair process is changed in a manner that allows the selected repair process to obtain the desired bonding of the patch. In these examples, the rework may be considered capable of being performed if the result of the rework is within design tolerances.

Figure 3:
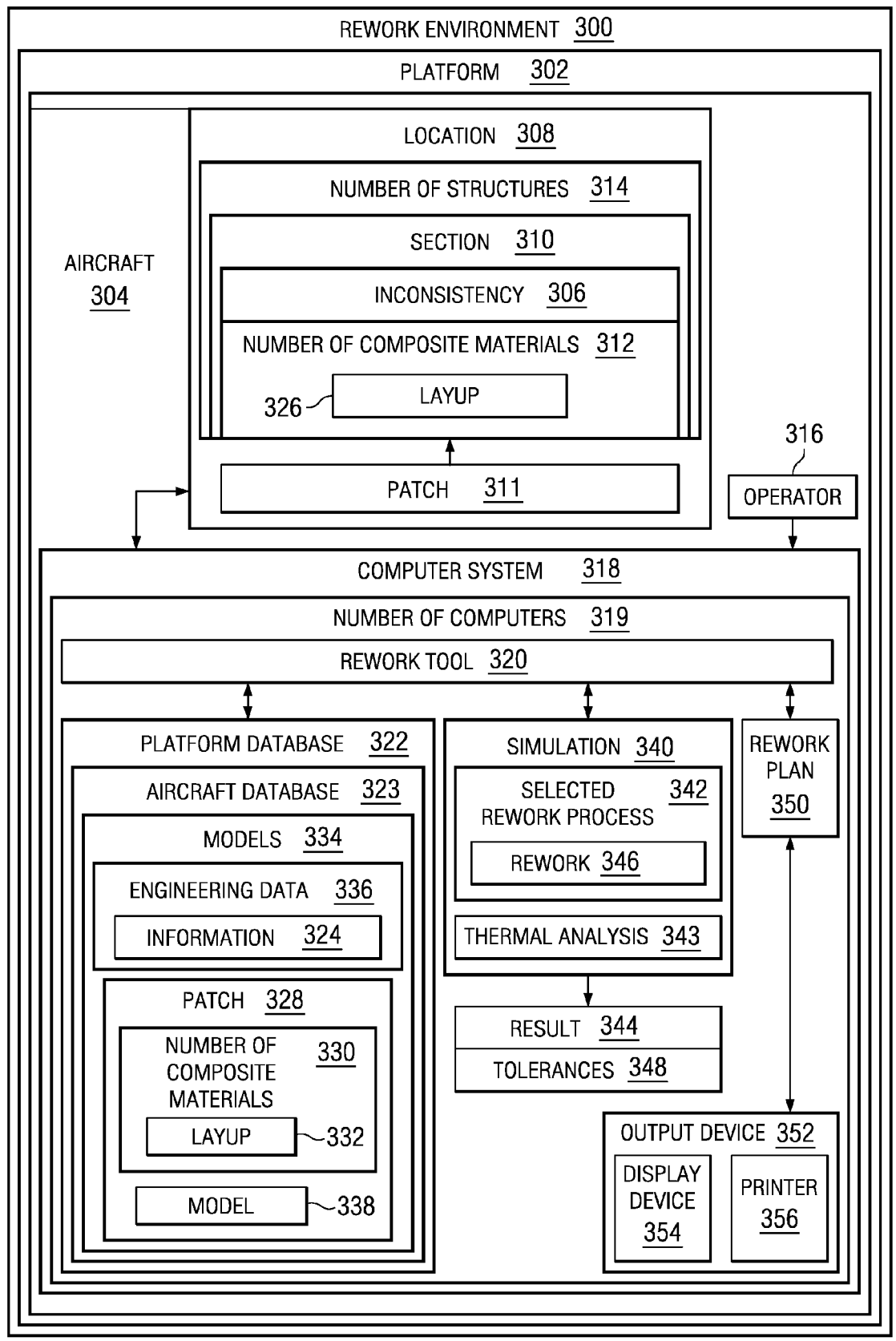
FIG. 3 is an illustration of a rework environment in accordance with an advantageous embodiment.

With reference now to FIG. 3, an illustration of a rework environment is depicted in accordance with an advantageous embodiment. Rework environment 300 may be used to perform rework on platform 302. In this illustrative example, platform 302 may be aircraft 304. Aircraft 304 may be an example of aircraft 200 in FIG. 2.

In this illustrative example, inconsistency 306 may be located in location 308. Section 310 may be identified within location 308. Section 310 may include inconsistency 306. Location 308 may have number of composite materials 312 removed to form section 310 to receive patch 311. Patch 311 may be bonded to section 310. Patch 311 may replace number of composite materials 312 removed from section 310 in these illustrative examples.

In these illustrative examples, number of structures 314 may be associated with section 310. Number of structures 314 may be considered to be associated with section 310 by including section 310, being adjacent to section 310, and/or being located within some distance of section 310 that may affect and/or be affected by bonding of patch 311 to section 310 in these illustrative examples.

Location 308 may be identified by operator 316. Location 308 may take the form of coordinates, measurements, and/or other information used to identify location 308. Operator 316 may be, for example, without limitation, a maintenance person, a technician, a pilot, or some other person. Operator 316 may input location 308 into computer system 318.

Computer system 318 may be number of computers 319. These computers may be networked or in communication with each other. In the illustrative examples, rework tool 320 may use location 308 to identify number of composite materials 312 in section 310 and/or number of structures 314 in location 308 in which inconsistency 306 may be found for platform 302. In these illustrative examples, rework tool 320 may use platform database 322 to identify information 324 about number of structures 314 and layup 326 for number of composite materials 312. Information 324 about layup 326 may be used to generate patch 328.

In these illustrative examples, patch 328 may be a model of patch 311 and may comprise number of composite materials 330 having layup 332. Layup 332 may be based on information 324 about layup 326 as identified from platform database 322. Platform database 322 may be located on one or more of number of computers 319. Further, platform database 322 may be, without limitation, aircraft database 323. In these illustrative examples, platform database 322 may include models 334, which may contain engineering data 336.

Engineering data 336, in these examples, may contain, for example, without limitation, information 324 about number of structures 314 and layup 326 for number of composite materials 312. Further, engineering data 336 may include other information about platform 302 that may be used to generate patch 328. In this illustrative example, patch 328 may take the form of model 338 and may be used by rework tool 320.

Rework tool 320 may perform simulation 340 using patch 328. In these illustrative examples, simulation 340 may be a simulation of selected rework process 342 using patch 328 and/or information 324 about number of structures 314. For example, without limitation, simulation 340 may simulate the bonding of patch 328 in section 310. Simulation 340 may also take into account number of structures 314. For example, simulation 340 may include thermal analysis 343. Thermal analysis 343 may identify the distribution and/or movement of heat during bonding of patch 328 to section 310.

Simulation 340 may generate result 344. Result 344 may be examined by operator 316 to determine whether selected rework process 342 is capable of providing rework 346 for section 310 in location 308 of platform 302. If selected rework process 342 is capable of providing rework 346, rework 346 may then be performed on section 310 in which inconsistency 306 is found in location 308 on platform 302.

If selected rework process 342 is not capable of being used to perform rework 346, at least one of selected rework process 342 and patch 328 may be modified. Then, simulation 340 may be performed using selected rework process 342 after modifying at least one of selected rework process 342 and patch 328. This process may be repeated until selected rework process 342 is capable of being used to perform rework 346. In these illustrative examples, selected rework process 342 may be capable of being used to perform rework 346 if result 344 meets tolerances 348. Tolerances 348 may be, for example, without limitation, temperatures occurring during curing of patch 328 using selected rework process 342. For example, selected ranges of temperatures may be desired to obtain proper curing of patch 328 using selected rework process 342 to perform rework 346.

For example, without limitation, the temperature in patch 328 may be around 350 degrees Fahrenheit plus or minus 10 degrees Fahrenheit to cure patch 328. A substructure near location 308 in which patch 328 is placed may affect the temperatures reached by patch 328. For example, a substructure may act as a heat sink. This situation may cause uneven heat distribution that may exceed the desired temperature level. In other cases, cool spots may occur under the desired temperature level.

As a result, patch 328 may need to be removed and selected rework process 342 repeated if the process were actually performed on an actual patch. With these simulations, changes may be identified to selected rework process 342.

In these illustrative examples, if selected rework process 342 is capable of being used for rework 346, rework tool 320 may generate rework plan 350 for use by operator 316 and/or some other operator. Rework plan 350 may be output at output device 352. Output device 352 may be at least one of display device 354, printer 356, and/or some other suitable output device.

With rework plan 350, operator 316 may fabricate patch 311. Patch 311 may then be bonded to section 310 to provide rework 346 for inconsistency 306 in section 310 contained in location 308 of platform 302.

The illustration of rework environment 300 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in different advantageous embodiments, additional locations with additional inconsistencies may be identified in addition to inconsistency 306. In yet other advantageous embodiments, more than one inconsistency may be present at location 308. With this type of implementation, patch 311 may be used to provide the rework for both inconsistencies.

As yet another example, in some advantageous embodiments, other operators, in addition to operator 316, may be present. Operator 316 may locate inconsistency 306, while another operator may input location 308 into computer system 318. In still other advantageous embodiments, another operator may perform rework 346 once rework plan 350 has been generated.

Figure 4:
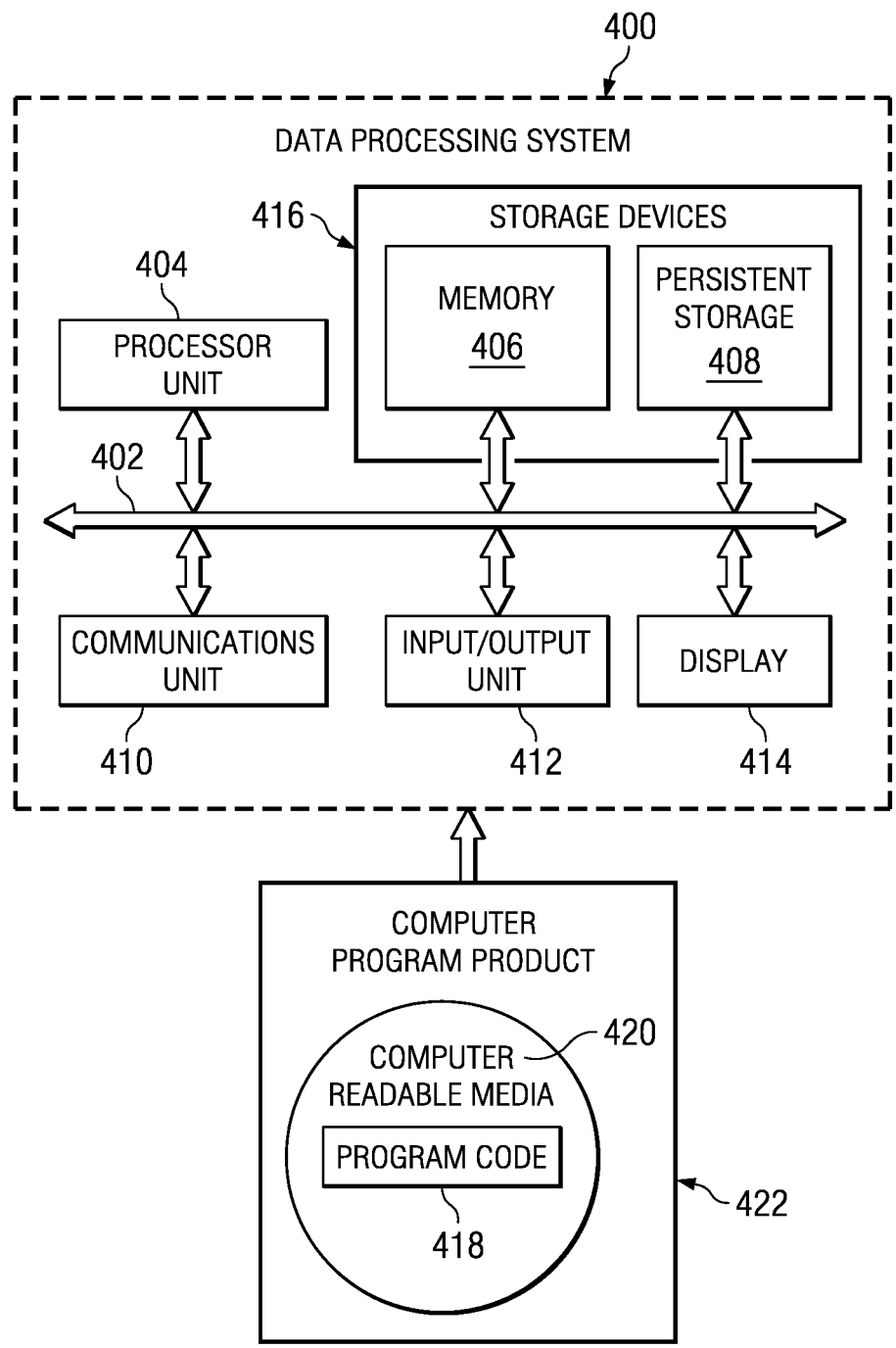
FIG. 4 is an illustration of a data processing system in accordance with an advantageous embodiment.

Turning now to FIG. 4, a diagram of a data processing system is depicted in accordance with an advantageous embodiment. Data processing system 400 may be used to implement one or more of number of computers 319 in computer system 318 in FIG. 3. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information such as, for example, without limitation, data, program code in functional form, and/or other suitable information either on a temporary basis and/or a permanent basis. Memory 406, in these examples, may be, for example, a random access memory or any other suitable volatile or non-volatile storage device.

Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be in a tangible form such as, for example, without limitation, an optical or magnetic disk that is inserted or placed into a drive or other device that is part of persistent storage 408 for transfer onto a storage device, such as a hard drive, that is part of persistent storage 408.

In a tangible form, computer readable media 420 also may take the form of a persistent storage, such as a hard drive, a thumb drive, or a flash memory, that is connected to data processing system 400. The tangible form of computer readable media 420 is also referred to as computer recordable storage media. In some instances, computer readable media 420 may not be removable.

Alternatively, program code 418 may be transferred to data processing system 400 from computer readable media 420 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 406 or a cache such as found in an interface and memory controller hub that may be present in communications fabric 402.

Figure 5:
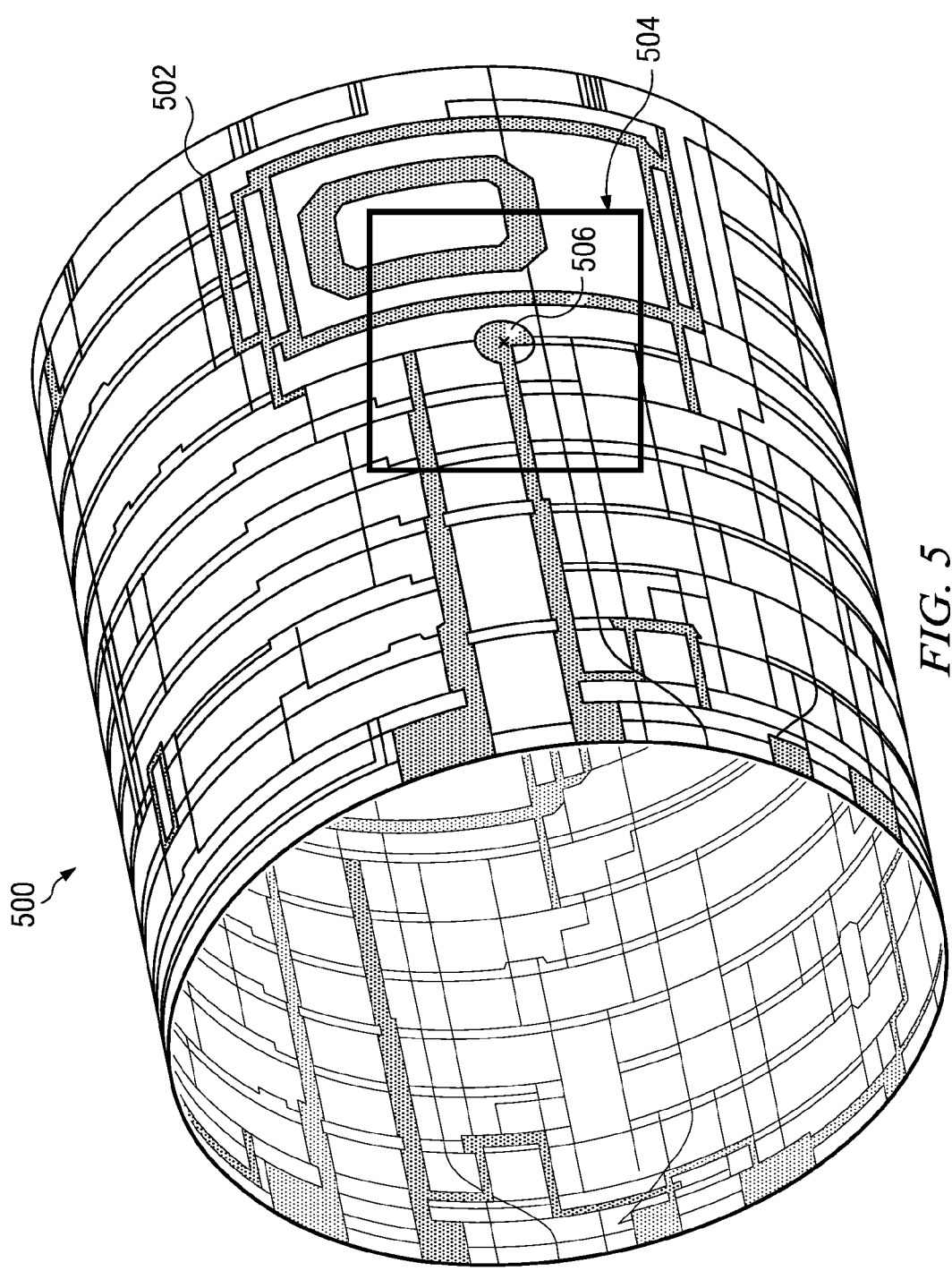
FIG. 5 is an illustration of a portion of a fuselage in accordance with an advantageous embodiment.

With reference now to FIG. 5, an illustration of a portion of a fuselage is depicted in accordance with an advantageous embodiment. In this example, display 500 is an example of a display that may be generated by rework tool 320 in FIG. 3. This display may be generated in computer system 318 on display device 354 in the illustrative examples.

In this illustrative example, fuselage 502 may be an example of a portion of a platform, such as platform 302. In particular, fuselage 502 may be a part of aircraft 304 in FIG. 3.

In this example, location 504 has been identified as having inconsistency 506.

Figure 6:
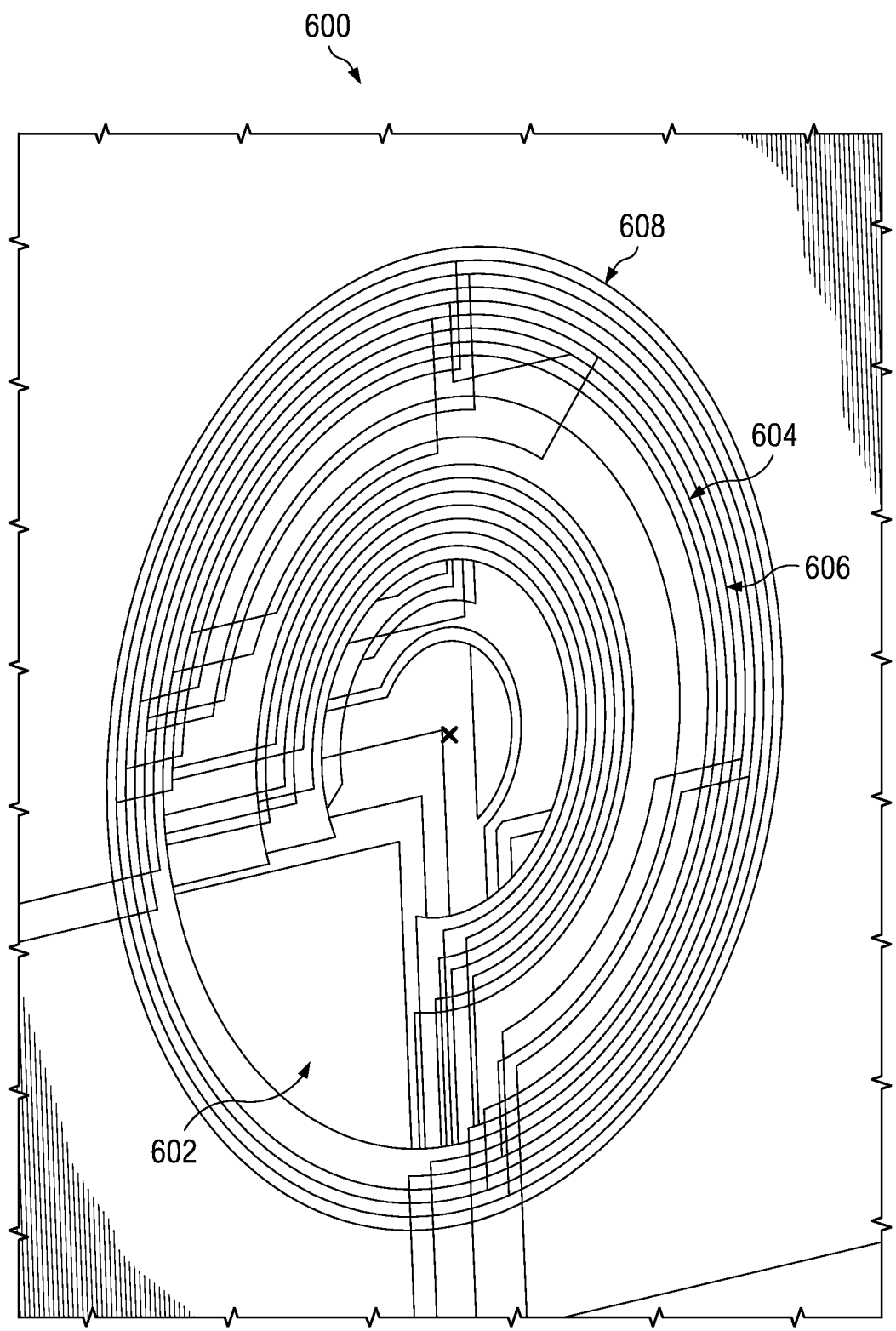
FIG. 6 is an illustration of a section for a rework in accordance with an advantageous embodiment.

With reference now to FIG. 6, an illustration of a section for rework is depicted in accordance with an advantageous embodiment. In this illustrative example, display 600 is an example of a display that may be generated by rework tool 320 executing on computer system 318 at display device 354 in FIG. 3. Further, display 600 may present location 504 of fuselage 502 in FIG. 5.

As illustrated, section 602 is shown without inconsistency 506 in FIG. 5. In this example, section 602 may be seen with layers 604 of composite material 606 exposed after removal of a portion of composite material 606 to remove inconsistency 506. In this example, removal of the portion of composite material 606 forms scarf edge 608.

Section 602 may be a volume in which composite materials 606 have been removed and may be configured to receive a patch. A patch (not shown) may be placed into section 602 to perform rework for location 504 on fuselage 502 in FIG. 5.

Figure 7:
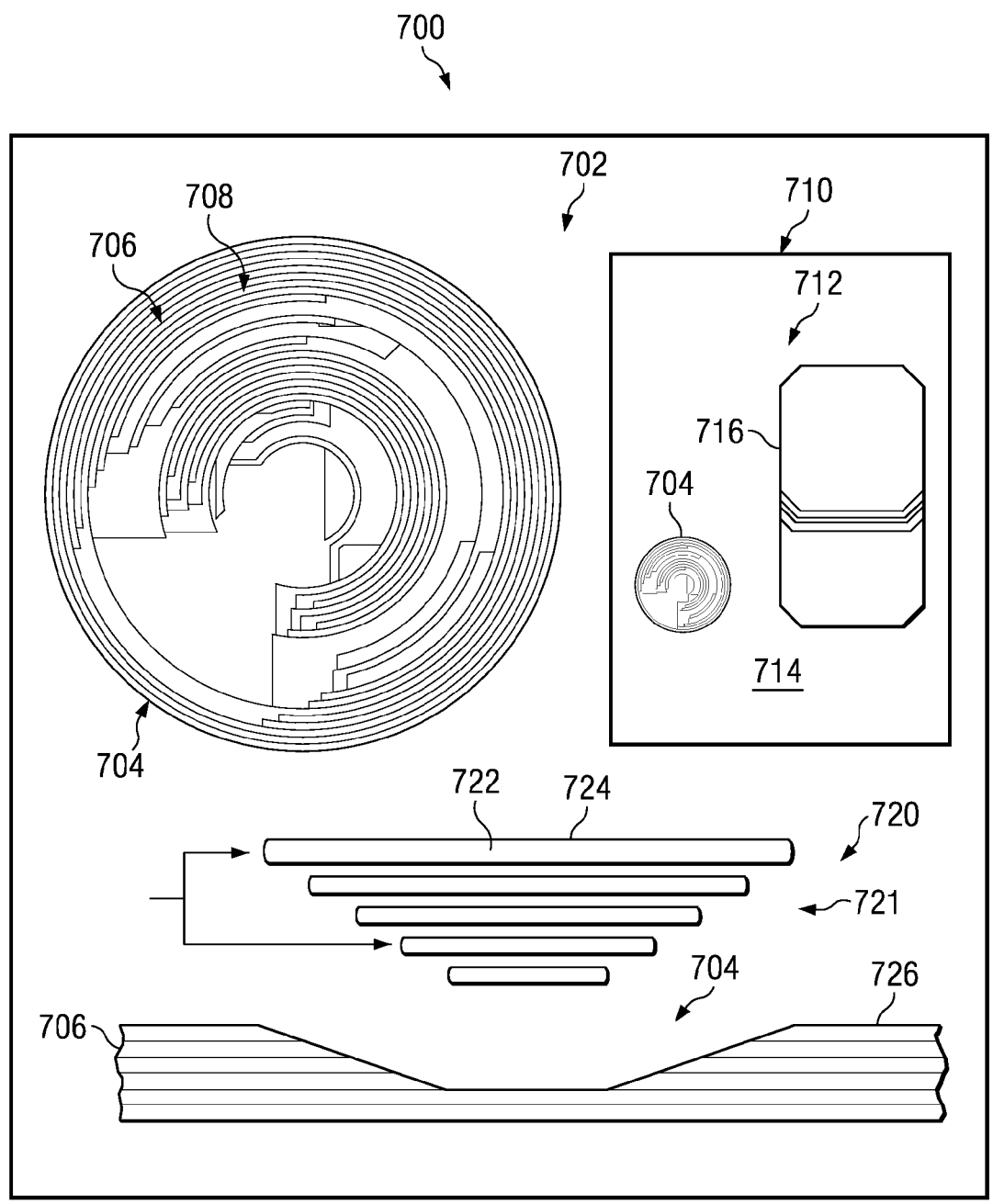
FIG. 7 is an illustration of a display of a rework plan in accordance with an advantageous embodiment.

With reference now to FIG. 7, an illustration of a display of a rework plan is depicted in accordance with an advantageous embodiment. In this illustrative example, display 700 is an example of a display that may be generated by rework tool 320 executing on computer system 318. Display 700 may illustrate rework plan 702, which may be an example of rework plan 350 presented on display device 354 in FIG. 3.

In this illustrative example, section 704 may illustrate a portion of a platform with layers 706 of composite material 708 exposed. In area 710 of display 700, section 704 may be presented in location 712 on fuselage 714. In this illustrative example, feature 716 may be seen on fuselage 714 for reference for section 704 of location 712 on fuselage 714.

Display 700 also may present patch 720 in cross-sectional view 721. In this view, layers 722 of composite material 724 for patch 720 may be seen. Further, cross section 726 showing section 704 may be displayed. In cross section 726, layers 706 for composite material 708 may be seen in a cross-sectional view. Layers 706 in section 704 may have a configuration for a scarf rework.

The illustrations of the displays in FIGS. 5-7 are not meant to imply limitations to the manner in which displays may be presented for different advantageous embodiments. Other components in addition to or in place of the ones illustrated in these figures may be used. Some components illustrated also may be unnecessary in some advantageous embodiments.

For example, without limitation, in some advantageous embodiments, display 500 may display the entire aircraft, rather than a portion of fuselage 502. As yet another example, in some advantageous embodiments, section 602 may have a shape other than a circular shape. For example, without limitation, section 602 may have a shape of an oval, a square, a rectangle, a pentagon, an octagon, an irregular shape, or some other suitable shape.

In yet other advantageous embodiments, display 700 may include additional presentations of information needed to perform rework. Further, for example, without limitation, instructions or links to instructions also may be present in display 700. In some advantageous embodiments, the information presented in display 700 may be presented in other forms. For example, without limitation, display 700 may be output in paper and/or hard copy form at an output device, such as a printer.

Figure 8:
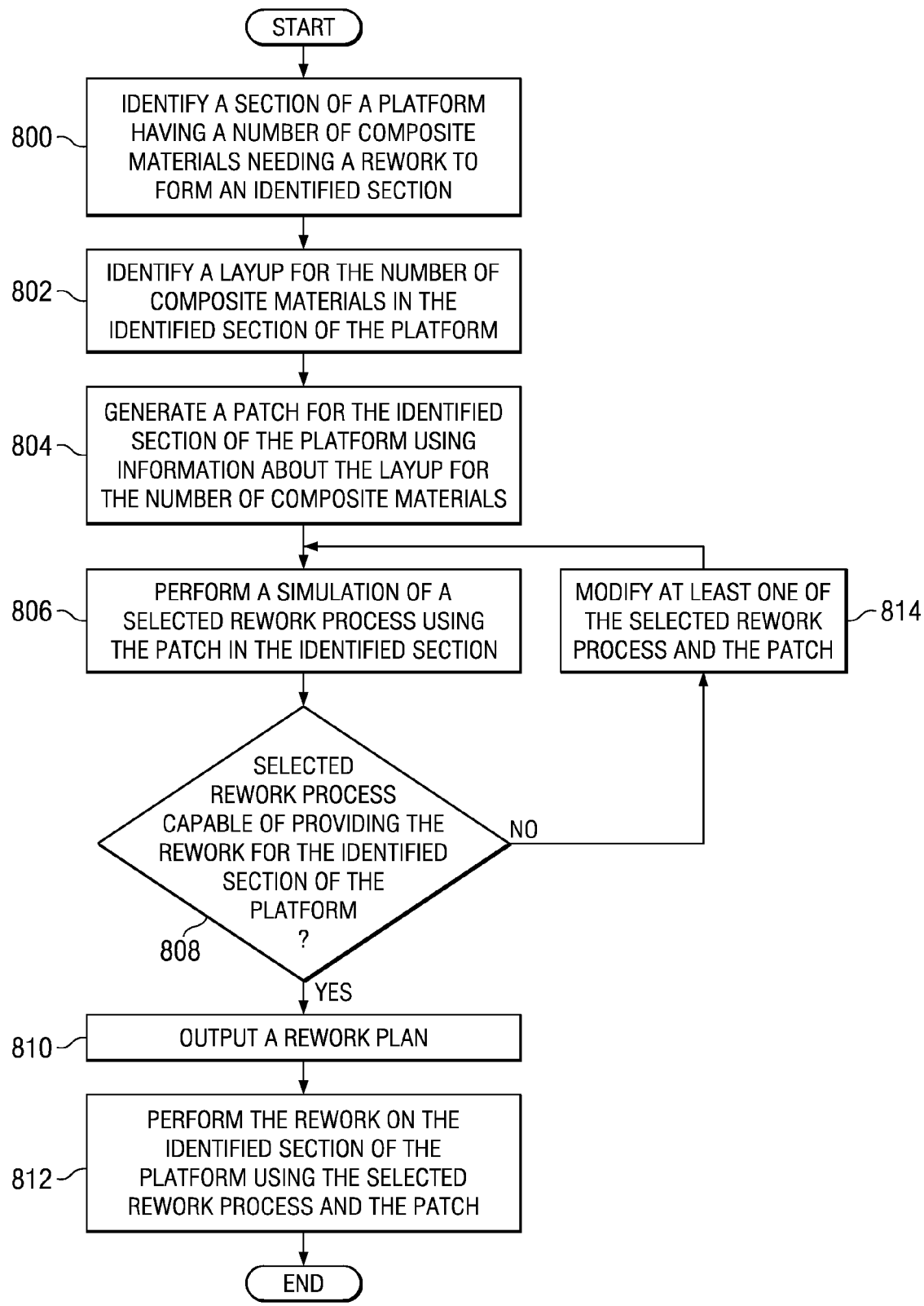
FIG. 8 is an illustration of a flowchart for managing rework in accordance with an advantageous embodiment.

Turning now to FIG. 8, an illustration of a flowchart for managing rework is depicted in accordance with an advantageous embodiment. The process illustrated in FIG. 8 may be implemented in rework environment 300 in FIG. 3. In particular, the different operations illustrated in FIG. 8 may be implemented within rework tool 320.

The process may begin by identifying section 310 of platform 302 having number of composite materials 312 needing rework 346 to form an identified section (operation 800). In these illustrative examples, the identified section may be a three-dimensional shape and may be configured to receive patch 311. This operation may be performed by operator 316 selecting location 308 in which section 310 may be found on a display within computer system 318. Operator 316 may then select a shape for number of composite materials 312 to be removed from section 310 in location 308 of platform 302.

In yet other advantageous embodiments, section 310 may be identified by inputting coordinates identified for location 308 of inconsistency 306. Of course, any technique may be used to identify section 310 of platform 302 needing rework 346.

The process may then identify layup 326 for number of composite materials 312 in the identified section of platform 302 (operation 802). Operation 802 may be performed using a model within models 334 of platform 302 containing information 324 about structures, materials, and/or other suitable information about platform 302.

The process may then generate patch 328 for the identified section of platform 302 using information 324 about layup 326 for number of composite materials 312 (operation 804). Patch 328 may be designed to replace number of composite materials 312 removed from section 310 in location 308 in these illustrative examples. Operation 804 may be an automatic operation performed by the process. In yet other advantageous embodiments, patch 328 may be designed with user input.

The process may then perform simulation 340 of selected rework process 342 using patch 328 in the identified section (operation 806). A determination may be made as to whether selected rework process 342 is capable of providing rework 346 for the identified section of platform 302 (operation 808). This operation may be performed by comparing result 344 of simulation 340 to tolerances 348 or other design parameters desired for section 310 of platform 302.

If selected rework process 342 is capable of providing rework 346, rework plan 350 may be output (operation 810). Thereafter, rework 346 may be performed on the identified section of platform 302 using selected rework process 342 and patch 328 (operation 812), with the process terminating thereafter. This operation may be performed using rework plan 350.

With reference again to operation 808, if selected rework process 342 is unable to provide rework 346, the process may modify at least one of selected rework process 342 and patch 328 (operation 814). Thereafter, the process may return to operation 806 to perform another simulation of selected rework process 342 after modifying at least one of selected rework process 342 and patch 328.

Figure 9:
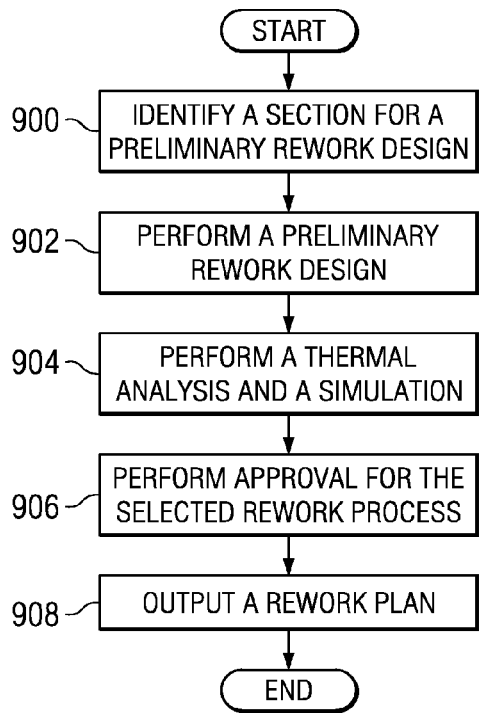
FIG. 9 is an illustration of a flowchart for generating a rework plan in accordance with an advantageous embodiment.

Turning next to FIG. 9, an illustration of a flowchart for generating a rework plan is depicted in accordance with an advantageous embodiment. The process illustrated in FIG. 9 may be implemented in rework environment 300 in FIG. 3. This process may be implemented within rework tool 320 and used to generate rework plan 350 in FIG. 3.

The process may begin by identifying section 310 for a preliminary rework design (operation 900). Section 310 may be configured to receive patch 311 to perform rework 346. The process may then perform a preliminary rework design (operation 902). This operation may identify selected rework process 342. Selected rework process 342 may take the form of a template and/or other type of suitable process. Next, the process may perform thermal analysis 343 and simulation 340 (operation 904).

The process may then perform approval for selected rework process 342 (operation 906). This approval may be performed by sending selected rework process 342 and result 344 of simulation 340 to various entities for review. This review may include, for example, without limitation, an engineering review, a material review, a process review, and/or some other suitable type of review. This review may be performed by other people, analysis programs, and/or other suitable resources.

The process may then output rework plan 350 (operation 908), with the process terminating thereafter. Operation 908 may provide rework plan 350 in a hard copy form using printer 356 and/or on a display using display device 354. When hard copy materials are created, rework plans, templates for the rework, drawings, and/or other suitable information may be generated in hard copy form for use.

Figure 10:
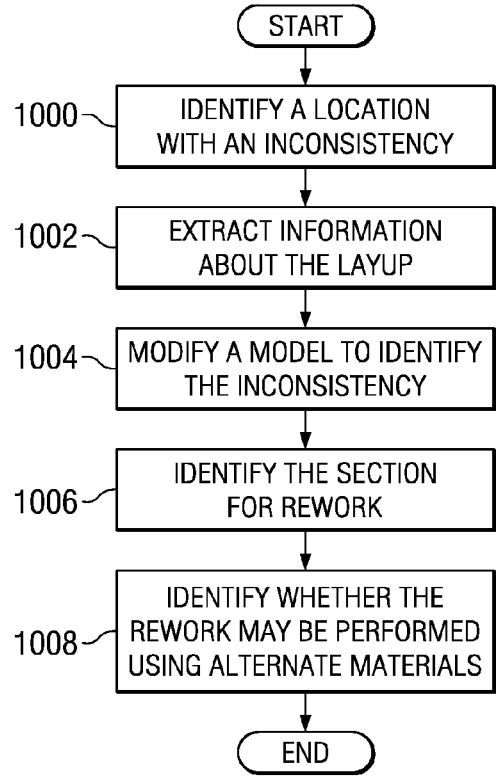
FIG. 10 is an illustration of a process for identifying a section in accordance with an advantageous embodiment.

With reference now to FIG. 10, an illustration of a process for identifying a section is depicted in accordance with an advantageous embodiment. The process illustrated in FIG. 10 is an example of one implementation of operation 900 in FIG. 9.

The process may begin by identifying location 308 with inconsistency 306 (operation 1000). Operation 1000 may be performed using various techniques presently available for identifying inconsistencies. In operation 1000, operator 316 may identify a location, a size, a shape, a depth, and/or other information about inconsistency 306 in location 308 of the composite part. In operation 1000, operator 316 also may determine whether a single part contains inconsistency 306 or if inconsistency 306 involves multiple parts or number of structures 314.

The process may then extract information 324 about layup 326 (operation 1002). Information 324 about layup 326 may include information about the different layers, orientations, materials, and/or other information about number of structures 314. This information about the composite structure may be extracted from a database or model such as, for example, without limitation, platform database 322, in these illustrative examples. The process may then modify a model within models 334 to identify inconsistency 306 (operation 1004). This operation may involve modifying the model of platform 302 to show the location, size, shape, depth, and/or other information about inconsistency 306.

The process may then identify section 310 for rework 346 (operation 1006). This operation may include identifying a location and shape for rework 346. Section 310 may be configured to receive patch 311 in these illustrative examples. Section 310 also may be referred to as a scarf in the illustrative examples.

The shape of section 310 may be selected to be consistent with various standards or tolerances 348 for performing rework. The shape may have, for example, without limitation, a width, a height, a thickness, and/or other information to identify the shape for section 310.

The process may then identify whether rework 346 may be performed using alternate materials (operation 1008), with the process terminating thereafter. This operation may be used to identify whether different materials may be substituted for number of composite materials 312 in section 310 for the composite structure within number of structures 314. Alternative materials for number of composite materials 312 may be identified in case the original materials are unavailable.

Figure 11:
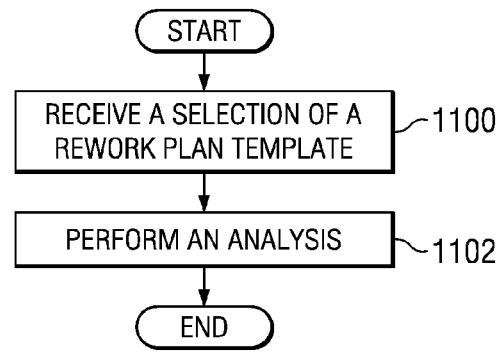
FIG. 11 is an illustration of a preliminary rework design process in accordance with an advantageous embodiment.

With reference now to FIG. 11, an illustration of a preliminary rework design process is depicted in accordance with an advantageous embodiment. The flowchart in FIG. 11 is an example of one implementation of operation 902 in FIG. 9.

The process may begin by receiving a selection of a rework plan template (operation 1100). In operation 1100, the rework plan template may be a file containing information needed to perform a stress analysis for rework 346. Operation 1100 may be performed through operator 316 selecting a rework design template for use in documenting rework 346. The process may then perform an analysis (operation 1102), with the process terminating thereafter. In these examples, operation 1102 is a stress analysis performed for rework 346. The analysis may be used to determine whether rework 346 using patch 311 meets tolerances required for rework 346.

Figure 12:
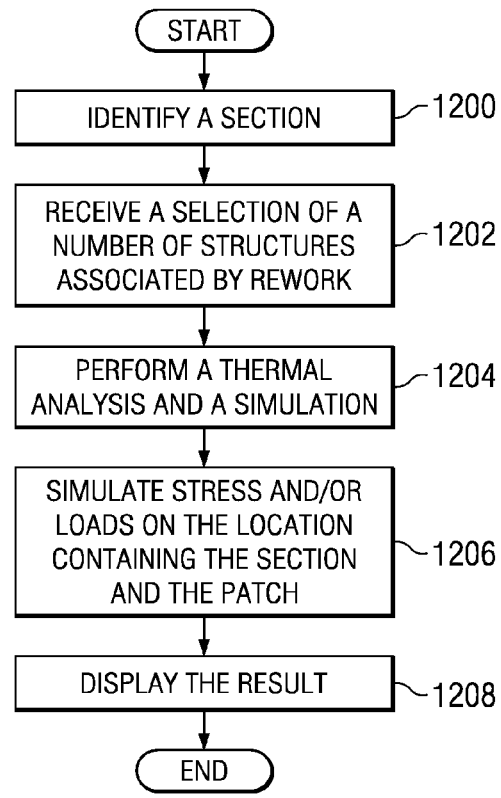
FIG. 12 is an illustration of a flowchart for performing thermal analysis and rework simulation in accordance with an advantageous embodiment.

Turning now to FIG. 12, an illustration of a flowchart for performing thermal analysis and rework simulation is depicted in accordance with an advantageous embodiment. The process illustrated in FIG. 12 is an example of one implementation for operation 904 in FIG. 9.

The process may begin by identifying section 310 (operation 1200). This section may be, for example, without limitation, a geometry for receiving patch 311 for rework 346. This geometry may identify layers of composite material that may be removed for rework. These layers may be removed to remove inconsistency 306 and provide a recess or area for patch 311.

The process may then receive a selection of number of structures 314 associated by rework 346 (operation 1202). This process may be performed by operator 316 selecting number of structures 314 that may be affected in performing rework 346. Number of structures 314 may include the structure in which inconsistency 306 is found, structures affected by performing the rework, structures that may affect performance of the rework, and/or other structures relevant to performing the rework process.

Number of structures 314 may be structures adjacent to or located near the structure in which the rework is to be performed. These structures may be structures that may act as heat sinks that may change the temperature of the composite structure during a heating process.

Further, these structures also may be composite structures that may receive thermal energy, heat, and/or other effects from a heating process. These composite structures may be affected in a way that may cause additional inconsistencies, depending on the particular composite structure and its relation to the structure in which section 310 is located.

The process may then perform thermal analysis 343 and simulation 340 (operation 1204). This operation may involve performing simulation 340 with thermal analysis 343. Simulation 340 may be performed in these examples to simulate or identify temperature drops that may occur across section 310 of a composite part with patch 311 being bonded to section 310 with heat.

The different advantageous embodiments recognize and take into account that other structures adjacent to or approximate to the structure in which the section is located may act as a heat sink. This situation may increase the difficulty in controlling a curing temperature for the patch. This difficulty may increase with the complexity of the structure in which the rework is being made, as well as other structures adjacent to or approximate to the structure in which the rework is being performed.

Simulation 340 in operation 1204 may identify locations of hot and/or cold spots that may be used to provide adjustments to heating and/or insulation to provide a desired cure temperature in the area in which rework 346 may be performed. In the illustrative examples, thermal analysis 343 may be performed using any currently available thermal analysis process. For example, thermal analysis 343 may be performed with software capable of simulating a rework with non-linear boundary conditions. The software may be implemented using any currently available thermal modeling tool. In other advantageous embodiments, thermal analysis 343 may be performed using a non-linear finite element model.

The process may then simulate stress and/or loads on location 308 containing section 310 and patch 311 (operation 1206). This analysis may be performed using a finite analysis program.

The process may then display result 344 (operation 1208), with the process terminating thereafter. Result 344 may be used by operator 316 to determine if rework 346 may be performed using selected rework process 342. In other words, a determination may be made as to whether rework 346 may be performed in such a way that the area meets tolerances 348 and/or other parameters for rework 346.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments may provide a method and apparatus for managing rework. In one or more of the advantageous embodiments, a section of a platform having a number of composite materials needing a rework may be identified to form an identified section. A layup may be identified for the number of composite materials needed in the defined section of the platform. A patch may be generated for that in-flight section of the platform using the layup for the number of composite materials. A simulation of a selected rework process may be performed using the patch in the identified section.

The different advantageous embodiments may provide a capability to perform rework in a manner in which removal of a patch and installation of another patch may be avoided. The different advantageous embodiments may provide a capability to identify an appropriate rework process that may be capable of performing rework for an inconsistency that may be present in a location in a platform. In this manner, the different advantageous embodiments may be capable of providing improvements in the quality of and/or speed at which rework to composite structures may be made. In this manner, rework to composite structures may be performed with less expense.

Although the different advantageous embodiments have been described with respect to aircraft, other advantageous embodiments may be applied to other types of platforms. For example, without limitation, other advantageous embodiments may be applied to a mobile platform, a stationary platform, a land-based structure, an aquatic-based structure, a space-based structure, and/or some other suitable object.

More specifically, the different advantageous embodiments may be applied to, for example, without limitation, a submarine, a spacecraft, a space station, a satellite, a surface ship, and/or some other suitable platform.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing rework, the method comprising:
    identifying a section of a platform having a number of composite materials needing a rework to form an identified section, the composite materials comprising fibers and resin;
    identifying a selected rework process to perform the rework of the identified section, the selected rework process comprising a process to bond a patch to the identified section;
    performing, by a computer system, a simulation of the selected rework process to determine whether the selected rework process provides the rework for the identified section, the simulation including a thermal analysis, the thermal analysis taking into account a number of structures associated with the identified section wherein the number of structures associated with the identified section are located within a distance of the identified section such that the number of structures affect or are affected by bonding of the patch to the identified section;
    responsive to an absence of a determination that the selected rework process provides the rework, modifying at least one of the selected rework process and the patch;
    performing another simulation of the selected rework process after modifying at least one of the selected rework process and the patch; and
    repeating the steps of responsive to the absence of the determination that the selected rework process provides the rework, modifying at least one of the selected rework process and the patch and performing the another simulation of the selected rework process after modifying at least one of the selected rework process and the patch until the selected rework process provides the rework.

2. The method of claim 1 further comprising:
    responsive to a determination that the selected rework process provides the rework, performing the rework on the identified section using the selected rework process.

3. The method of claim 1 further comprising:
    responsive to a determination that the selected rework process provides the rework, outputting a rework plan for the selected rework process; and
    performing the rework on the identified section using the rework plan.

4. The method of claim 1 further comprising:
obtaining information about the number of structures associated with the identified section from a platform database.

5. The method of claim 1, wherein the step of performing the another simulation of the selected rework process after modifying at least one of the selected rework process and the patch comprises:
performing the another simulation of the selected rework process after modifying at least one of the selected rework process and the patch using the patch in the identified section and a number of structures associated with the identified section.

6. The method of claim 1 further comprising:
identifying a location on the platform having an inconsistency.

7. The method of claim 6, wherein the step of identifying the section of the platform having the number of composite materials needing the rework to form the identified section comprises:
identifying the section of the platform having the number of composite materials needing the rework that includes the inconsistency to form the identified section.

8. The method of claim 1, wherein the section is a location for a patch.

9. The method of claim 1, further comprising:
generating the patch for the identified section using a layup for the number of composite materials, wherein the patch comprises a plurality of layers of the number of composite materials.

10. The method of claim 1, wherein determining whether the selected rework process provides the rework for the identified section comprises determining whether the selected rework process will cause inconsistencies.

11. The method of claim 1, further comprising:
generating the patch for the identified section using a layup for the number of composite materials; and
wherein determining whether the selected rework process provides the rework for the identified section comprises determining whether the selected rework process meets tolerances, tolerances including temperatures during curing of the patch.

12. The method of claim 1, wherein the thermal analysis identifies distribution or movement of heat during bonding of the patch to the identified section using the selected rework process.

13. A method for simulating a rework process for an aircraft, the method comprising:
identifying a location on the aircraft having an inconsistency;
identifying a section of the aircraft having a number of composite materials needing a rework that includes the inconsistency to form an identified section, the composite materials comprising fibers and resin;
determining a layup for the number of composite materials in the identified section;
obtaining information about a number of structures associated with the identified section from an aircraft database;
generating a patch for the identified section using a computer system and the layup for the number of composite materials, wherein the patch comprises a plurality of layers of the number of composite materials;
identifying, by the computer system, a selected rework process to perform the rework of the identified section, the rework process comprising a process to bond the patch to the identified section;
performing a simulation of the selected rework process using the computer system, the patch in the identified section, and the number of structures, wherein the simulation includes a thermal analysis for the patch in the identified section taking into account the number of structures associated with the identified section, wherein the number of structures associated with the identified section are located within a distance of the identified section such that the number of structures affect or are affected by bonding of the patch to the identified section;
determining whether the selected rework process provides the rework for the identified section, wherein determining whether the selected rework process provides the rework for the identified section comprises determining whether the selected rework process will cause inconsistencies;
responsive to a determination that the selected rework process provides the rework, outputting a rework plan for the selected rework process at an output device and performing the rework on the identified section using the rework plan and the patch;
responsive to an absence of a determination that the selected rework process provides the rework, modifying at least one of the selected rework process and the patch;
performing another simulation of the selected rework process after modifying at least one of the selected rework process and the patch; and
repeating the steps of responsive to the absence of the determination that the selected rework process provides the rework, modifying at least one of the selected rework process and the patch and performing the another simulation of the selected rework process after modifying at least one of the selected rework process and the patch until the selected rework process provides the rework.

14. An apparatus comprising:
a computer system having a number of processor units and a number of storage devices; and
a rework tool stored in the number of storage devices in the computer system and executed by the computer system to identify a section of a platform having a number of composite materials needing rework to form an identified section, the composite materials comprising fibers and resin; identify a selected rework process to perform the rework of the identified section, the selected rework process comprising a process to bond a patch to the identified section; and perform a simulation of the selected rework process to determine whether the selected rework process provides the rework for the identified section, the simulation including a thermal analysis, the thermal analysis taking into account a number of structures associated with the identified section wherein the number of structures associated with the identified section are located within a distance of the identified section such that the number of structures affect or are affected by bonding of the patch to the identified section, responsive to an absence of a determination that the selected rework process provides the rework, modify at least one of the selected rework process and the patch, perform another simulation of the selected rework process after modifying at least one of the selected rework process and the patch, and repeat responsive to the absence of the determination that the selected rework process provides the rework, modifying at least one of the selected rework process and the patch and performing the another simulation of the selected rework process after modifying at least one of the selected rework process and the patch until the selected rework process provides the rework.

15. The apparatus of claim 14, wherein the rework tool is executed by the computer system to output a rework plan for the selected rework process in response to a determination that the selected rework process provides the rework.

16. The apparatus of claim 14, wherein the rework tool is executed by the computer system to generate a patch for the identified section using a layup for the number of composite materials; and modify at least one of the selected rework process and the patch in response to an absence of a determination that the selected rework process provides the rework; and perform another simulation of the selected rework process after modifying at least one of the selected rework process and the patch.

17. The apparatus of claim 14 wherein the rework tool is executed by the computer system to identify a location on the platform having an inconsistency.

18. The apparatus of claim 17, wherein in identifying the section of the platform having the number of composite materials needing the rework to form the identified section, the rework tool is executed by the computer system to identify the section of the platform having the number of composite materials needing the rework that includes the inconsistency to form the identified section.

19. The apparatus of claim 14, wherein the section is a location for a patch.

20. The apparatus of claim 14, wherein the rework tool is executed by the computer system to generate the patch for the identified section using a layup for the number of composite materials; and the patch comprises a plurality of layers of the number of composite materials.

21. The apparatus of claim 14, the thermal analysis identifying distribution or movement of heat during the bonding of the patch.

22. The apparatus of claim 14, wherein in determining whether the selected rework process provides the rework for the identified section, the rework tool is configured to be executed by the computer system to determine whether the selected rework process will cause inconsistencies.

23. A computer program product comprising:
a non-transitory computer recordable storage media;
program code, stored on the non-transitory computer recordable storage media, for identifying a section of a platform having a number of composite materials needing rework to form an identified section, the composite materials comprising fibers and resin;
program code, stored on the non-transitory computer recordable storage media, for identifying a selected rework process to perform the rework of the identified section, the selected rework process comprising a process to bond a patch to the identified section;
program code, stored on the non-transitory computer recordable storage media, for performing a simulation of a selected rework process to determine whether the selected rework process provides the rework for the identified section the simulation including a thermal analysis, the thermal analysis taking into account a number of structures associated with the identified section wherein the number of structures associated with the identified section are located within a distance of the identified section such that the number of structures affect or are affected by bonding of the patch to the identified section;
program code, stored on the non-transitory computer recordable storage media, for responsive to an absence of a determination that the selected rework process provides the rework, modifying at least one of the selected rework process and the patch;
program code, stored on the non-transitory computer recordable storage media, for performing another simulation of the selected rework process after modifying at least one of the selected rework process and the patch; and
program code, stored on the non-transitory computer recordable storage media, for repeating responsive to the absence of the determination that the selected rework process provides the rework, modifying at least one of the selected rework process and the patch and performing the another simulation of the selected rework process after modifying at least one of the selected rework process and the patch until the selected rework process provides the rework.

24. The computer program product of claim 23, wherein determining whether the selected rework process provides the rework for the identified section comprises determining whether the selected rework process will cause inconsistencies.

* * * * *